(12) United States Patent
Kim

(10) Patent No.: US 10,211,908 B2
(45) Date of Patent: Feb. 19, 2019

(54) MULTI-ANTENNA RELAY DEVICE

(71) Applicant: SOLiD, INC., Seongnam-si, Gyeonggi-do (KR)

(72) Inventor: Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/116,945

(22) PCT Filed: Apr. 9, 2014

(86) PCT No.: PCT/KR2014/003068
§ 371 (c)(1),
(2) Date: Aug. 5, 2016

(87) PCT Pub. No.: WO2015/156434
PCT Pub. Date: Oct. 15, 2015

(65) Prior Publication Data
US 2017/0141836 A1    May 18, 2017

(30) Foreign Application Priority Data

Apr. 7, 2014  (KR) .................. 10-2014-0041293

(51) Int. Cl.
*H04B 7/155*  (2006.01)

(52) U.S. Cl.
CPC ..... *H04B 7/15507* (2013.01); *H04B 7/15585* (2013.01)

(58) Field of Classification Search
CPC ................................. H04B 7/15507
See application file for complete search history.

(56) References Cited

U.S. PATENT DOCUMENTS

| | | | | |
|---|---|---|---|---|
| 2003/0202568 | A1* | 10/2003 | Choi | H04B 1/71075 375/148 |
| 2007/0110135 | A1* | 5/2007 | Guess | H04L 1/0048 375/148 |
| 2010/0062708 | A1* | 3/2010 | Sangiamwong | H04B 7/15585 455/24 |
| 2013/0208768 | A1* | 8/2013 | Song | H04B 11/00 375/218 |
| 2014/0119411 | A1* | 5/2014 | Kummetz | H04B 7/15585 375/211 |

FOREIGN PATENT DOCUMENTS

KR    10-2007-0072782 A    7/2007

OTHER PUBLICATIONS

International Search Report of PCT/KR2014/003068 dated Jan. 8, 2015 [PCT/ISA/210].
Written Opinion of PCT/KR2014/003068 dated Jan. 8, 2015 [PCT/ISA/237].

* cited by examiner

Primary Examiner — John D Blanton
(74) Attorney, Agent, or Firm — Sughrue Mion, PLLC

(57) ABSTRACT

Provided is a multi-antenna relay device. The multi-antenna relay device having first to n-th (n is a natural number of 2 or more) channel formed between receiving antennas and transmitting antennas corresponding to each other, comprising: first to n-th channel interference cancellation units, respectively, included in a corresponding channel among the first to n-th channels and canceling first to n-th channel interference signals corresponding to signals radiated through the first to n-th channels from signal input into the corresponding channel in real time.

9 Claims, 14 Drawing Sheets

MULTI-ANTENNA RELAY DEVICE

CROSS REFERENCE TO RELATED APPLICATIONS

This application is a National Stage of International Application No. PCT/KR2014/003068, filed Apr. 9, 2014, and claims priority from Korean Patent Applications No. 10-2014-0041293 filed Apr. 7, 2014, the contents of which are incorporated herein by reference in their entireties.

BACKGROUND

1. Field

The inventive concept relates to a multi-antenna relay device, and particularly, to a multi-antenna relay device which can cancel feedback signals due to signals radiated through multiple transmitting antennas in real time.

2. Description of Related Art

In general, a relay device is used for transmitting a signal between a base station and a terminal and service extension or improvement of a service quality in a radio signal shadow area. As one example of the relay device, a wireless relay device may be provided and the wireless relay device provides a communication service for receiving the signal transmitted from the base station or the terminal through a receiving antenna, amplifying the received signal, and transmitting the amplified signal to the terminal or the base station through a transmitting antenna.

The wireless relay device proposed in the related art had been primarily adopted a single transmitting/receiving antenna, but in recent years, a multi-transmitting/receiving antenna has been adopted in order to achieve transmission rate of a large bit within a limited bandwidth.

However, the wireless relay device adopting the multi-transmitting/receiving antenna (hereinafter, referred to as multi-antenna relay device) has a problem in that the number of transmitting/receiving antennas increases, feedback signals, that is, signals input into multiple receiving antennas as interference signals through a variety of paths, after the signals radiated from the transmitting antenna, significantly increase, and as a result, it is difficult to appropriately cope with a problem of interference in connection with an original signal and an oscillation problem.

SUMMARY

The inventive concept directs to a multi-antenna relay device which cancel interference signals by transmitted signals of all channels from received signals for respective channels in real time to minimize signal interference and oscillation.

According to an aspect of the inventive concept, there is provided a relay device having first to n-th (n is a natural number of 2 or more) channel formed between receiving antennas and transmitting antennas corresponding to each other, the relay device comprising: first to n-th channel interference cancellation units, respectively, included in a corresponding channel among the first to n-th channels and canceling first to n-th channel interference signals corresponding to signals radiated through the first to n-th channels from signal input into the corresponding channel in real time.

According to an exemplary embodiment, wherein at least one of the first to n-th channel interference cancellation unit may include first to n-th processing units connected to each other in series and configured to respectively generate an estimated interference signal by receiving a corresponding output signal among output signals of the first to n-th channel interference cancellation units and cancel an interference signal corresponding to the generated estimated interference signal among the first to n-th channel interference signals from the signal input into the corresponding channel.

According to an exemplary embodiment, wherein each of the first to n-th processing units may include, an estimated interference signal generating unit generating the estimated interference signal based on the received output signal; and a cancellation unit receiving the generated estimated interference signal and the signal input into the corresponding processing unit and canceling the interference signal corresponding to the generated estimated interference signal from the signal input into the corresponding processing unit.

According to an exemplary embodiment, wherein the estimated interference signal generating unit may include, a delay unit delaying the received output signal; a filter coefficient generating unit generating a filter coefficient based on the delayed output signal and the received output signal; and a modeling unit generating the estimated interference signal based on the filter coefficient and the received output signal.

According to an exemplary embodiment, wherein each of the first to n-th processing units may include, an estimated interference signal generating unit generating the estimated interference signal based on the received output signal and the signal input into the corresponding processing unit; and a cancellation unit receiving the generated estimated interference signal and the signal input into the corresponding processing unit and canceling the interference signal corresponding to the generated estimated interference signal from the signal input into the corresponding processing unit.

According to an exemplary embodiment, wherein the estimated interference signal generating unit may include, a delay unit delaying the received output signal; a filter coefficient generating unit generating the filter coefficient based on the delayed output signal and the signal input into the corresponding processing unit; and a modeling unit generating the estimated interference signal based on the filter coefficient and the signal input into the corresponding processing unit.

According to an exemplary embodiment, wherein at least one of the first to n-th channel interference cancellation units may include a processing unit configured to generate first to n-th estimated interference signals in parallel by receiving output signals of the first to n-th channel interference cancellation unit and sequentially cancel the first to n-th channel interference signals corresponding to the first to n-th estimated interference signals from the signal input into the corresponding channel.

According to an exemplary embodiment, wherein the processing unit may include, first to n-th estimated interference signal generating units, respectively, receiving the signal input into the corresponding channel and a corresponding output signal among the output signals of the first to n-th channel interference cancellation units and generating a corresponding estimated interference signal among the first to n-th estimated interference signals based on the signal input into the corresponding channel and the received output signal; and first to n-th cancellation units, respectively, receiving the corresponding estimated interference signal among the first to n-th estimated interference signals and canceling the corresponding interference signal among the first to n-th channel interference signals from the signal input into the corresponding channel by using the received estimated interference signal.

According to an exemplary embodiment, wherein at least one of the first to n-th channel interference cancellation units may include, at least one first processing unit configured to generate the estimated interference signal by receiving a corresponding output signal among the output signals of the first to n-th channel interference cancellation units and cancel an interference signal corresponding to the generated estimated interference signal among the first to n-th channel interference signals from the signal input into the corresponding channel; and a second processing unit connected with the first processing unit in series and configured to generate two or more estimated interference signals in parallel by receiving two or more output signals other than the output signal transmitted to the first processing unit among the output signals of the first to n-th channel interference cancellation units and cancel interference signals corresponding to the generated estimated interference signals among the first to n-th channel interference signals from the signal input into the corresponding channel.

According to an exemplary embodiment, wherein the relay device further comprise: at least one first processing unit configured to generate two or more the estimated interference signals in parallel by receiving two or more output signals among the output signals of the first to n-th channel interference cancellation units and cancel interference signals corresponding to the generated estimated interference signals among the first to n-th channel interference signals from the signal input into the corresponding channel; and a second processing unit configured to generate two or more estimated interference signals in parallel by receiving two or more output signals other than the output signals transmitted to the first processing unit among the output signals of the first to n-th channel interference cancellation units and cancel interference signals corresponding to the generated estimated interference signals among the first to n-th channel interference signals from the signal input into the corresponding channel.

According to the inventive concept, a multi-antenna relay device includes an interference cancellation unit for respective channels, formed between multiple receiving antennas and multiple transmitting antennas to correspond to each other, can rapidly cancel interference signals by signals transmitted through all channels.

As a result, according to the inventive concept, the multi-antenna relay device can improve transmission rate and a quality of a communication service, and minimize signal interference and oscillation.

BRIEF DESCRIPTION OF THE FIGURES

A brief description of each drawing is provided to more sufficiently understand drawings used in the detailed description of the inventive concept.

DETAILED DESCRIPTION OF EXEMPLARY EMBODIMENTS

Figure 1:
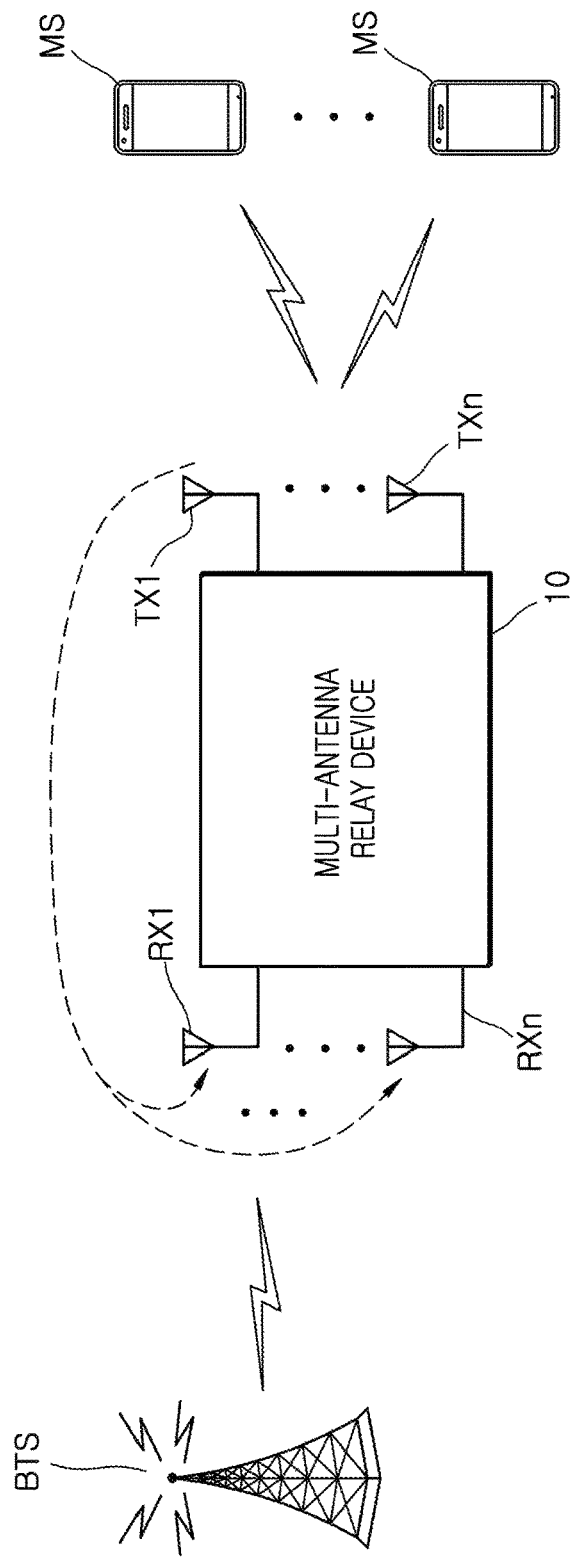
FIG. 1 is a diagram illustrating a relaying environment of a multi-antenna relay device according to an embodiment of the inventive concept.

Hereinafter, embodiments of the inventive concept will be described in detail with reference to the accompanying drawings. Like reference numerals refer to like elements in the drawings and a duplicated description of like elements will be skipped.

Embodiments of the inventive concept are provided to more completely describe the inventive concept to those skilled in the art and various modifications of the embodiments described below can be made and the scope of the inventive concept is not limited to the embodiments described below. Still, the embodiment is provided to make the present disclosure be more substantial and complete and completely transfer the spirit of the inventive concept to those skilled in the art.

In describing the embodiments of the inventive concept, detailed description of associated known function or constitutions will be omitted if they make the gist of the inventive concept unclear. In addition, numeral figures (for example, 1, 2, and the like) used during describing the specification are just identification symbols for distinguishing one element from another element. Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms used in the specification as terms used to appropriately express the embodiments of the inventive concept may be changed depending on an intention of a user or an operator or customs to which the inventive concept belongs. Accordingly, the terms need to be defined base on details throughout this specification. Like reference numerals refer to like elements presented in each drawing.

FIG. 1 is a diagram illustrating a relaying environment of a multi-antenna relay device 10 according to an embodiment of the inventive concept. In FIG. 1, an example of a case in which a downlink signal of a base station BTS is transmitted to a terminal through the multi-antenna relay device 10 is illustrated for convenience of the explanation and multiple donor antennas transmitting/receiving signals to/from the base station BTS are represented as receiving first to n-th (herein, n is a natural number of 2 or more) antennas RX1 to RXn and service antennas transmitting/receiving the signals to/from the terminal MS are represented as first to n-th transmitting antennas TX1 to TXn.

Referring to FIG. 1, the multi-antenna relay device 10 may amplify the downlink signals of the base station BTS received through the first to n-th receiving antennas RX1 to RXn and transmit the amplified downlink signals to the terminal MS through the first to n-th transmitting antennas TX1 to TXn.

In this case, the signals radiated through the first to n-th transmitting antennas TX1 to TXn may form interference signals by inputting into at least one of the first to n-th receiving antennas RX1 to RXn through a wireless environment. For example, as illustrated in FIG. 1, the signal radiated through the first transmitting antennas TX1 may form the interference signal by inputting into each of the first to n-th receiving antennas RX1 to RXn through the wireless environment. Similarly, In this case, the signals radiated through the second to n-th transmitting antennas TX2 to TXn may form the interference signals by inputting into each of the first to n-th receiving antennas RX1 to RXn through the wireless environment. As a result, while the downlink signal which is an original signal input into each of the first to n-th receiving antennas RX1 to RXn and the interference signals are aggregated to be amplified, the multi-antenna relay device 10 may be oscillated.

In order to solve such an oscillation problem, the multi-antenna relay device 10 includes interference cancellation units 200_1 to 200_n (see FIG. 2) which may cancel the interference signals by the signals radiated from all transmitting antennas for each channel formed between the receiving antenna and the transmitting antenna corresponding to each other. Hereinafter, this will be described in more detail with reference to FIG. 2, and the like.

The multi-antenna relay device 10 may amplify uplink signals of the terminal MS received through the first to n-th transmitting antennas TX1 to TXn and transmit the amplified uplink signals to the base station BTS through the first to n-th receiving antennas RX1 to RXn. Although not illustrated in FIG. 1, even in this case, the signals radiated through the receiving antenna RX may form interference signal by inputting into at least one of the first to n-th transmitting antennas TX1 to TXn through the wireless environment, and as a result, as the uplink signals of the terminal MS, which are the original signals input into the first to n-th transmitting antennas TX1 to TXn and the interference signals are aggregated and amplified, the multi-antenna relay device 10 may be oscillated. Although not illustrated in FIG. 1, the multi-antenna relay device 10 may further include an interference cancellation unit in an uplink similarly to the interference cancellation units 200_1 to 200_n in a downlink, which are described in FIG. 2, and the like, of course.

Figure 2:
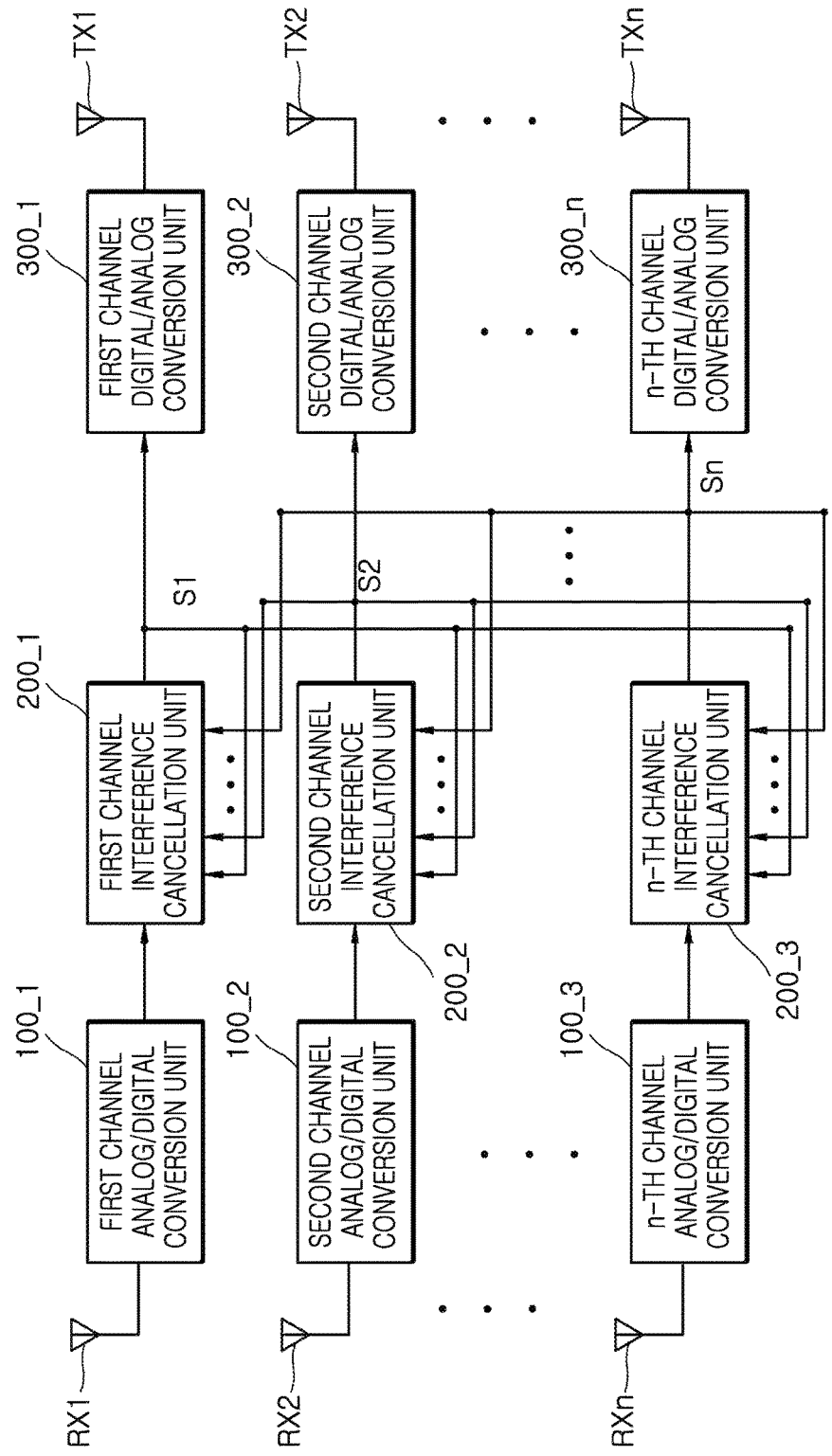
FIG. 2 is a block diagram schematically illustrating a multi-antenna relay device according to an embodiment of the inventive concept.

FIG. 2 is a block diagram schematically illustrating a multi-antenna relay device 10 according to an embodiment of the inventive concept. In FIG. 2, similarly to FIG. 1, for convenience of the explanation, only components for transmitting the downlink signals of the base station BTS (see FIG. 1) to the terminal MS (see FIG. 1) in the multi-antenna relay device 10 are illustrated. Since components for transmitting the uplink signals of the terminal MS (see FIG. 1) to the base station BTS (see FIG. 1) may correspond to the components for transmitting the downlink signals, hereinafter, detailed description of the components for transmitting the uplink signals will be omitted.

The multi-antenna relay device 10 may include the first to n-th receiving antennas RX1 to RXn and first to n-th channel analog/digital conversion units 100_1 to 100_n, the first to n-th channel interference cancellation units 200_1 to 200_n, and first to n-th digital/analog conversion units 300_1 to 300_n provided for respective first to n-th channels formed between the first to n-th receiving antennas RX1 to RXn and the first to n-th transmitting antennas TX1 to TXn corresponding to each other.

Since the analog/digital conversion units, the interference cancellation units, and the digital/analog conversion units provided for the respective first to n-th channels may have substantially the same configuration for the respective first to n-th channels, hereinafter, only the analog/digital conversion unit, the interference cancellation unit, and the digital/analog conversion unit provided in the first channel will be described as an example.

The first channel analog/digital conversion unit 100_1 may be connected with the first receiving antenna RX1. The first channel analog/digital conversion unit 100_1 may convert the signal input into the first channel through the first receiving antenna RX1 into a digital signal. The signal (hereinafter, referred to as a received signal) input into the first channel may include the downlink signal of the base station BTS (see FIG. 1) and at least one of signals transmitted through the first to n-th channels, that is, at least one of the first to n-th channel interference signals by the signals radiated through the first to n-th transmitting antennas TX1 to TXn.

Although not illustrated in FIG. 1, the multi-antenna relay device 10 may further include a low noise amplifier that amplifies the received signal to minimize noise of the received signal and a frequency down converter converting the received signal amplified by the low noise amplifier from a signal in a radio frequency (RF) band into a signal in an intermediate frequency band. However, the frequency down converter may be optionally omitted.

The first channel interference cancellation unit 200_1 may be connected with the first channel analog/digital conversion unit 100_1. The first channel interference cancellation unit 200_1 may receive the received signal converted into the digital signal from the first channel analog/digital conversion unit 100_1.

The first channel interference cancellation unit 200_1 may continuously receive output signals of the first to n-th channel interference cancellation units 200_1 to 200_n. Herein, the output signals S1 to Sn of the first to n-th channel interference cancellation units 200_1 to 200_n may be the original signals acquired by canceling the first to n-th channel interference signals from signals input into the respective channels, that is, the downlink signals of the base station BTS (see FIG. 1) input into the respective channels.

The first channel interference cancellation unit 200_1 may cancel the first to n-th channel interference signals from the digitally converted received signals by using the output signals S1 to Sn of the first to n-th channel interference cancellation units 200_1 to 200_n which are received thereto in real-time and output the interference cancelled signals. In detail, the first channel interference cancellation unit 200_1 may generate first to n-th estimated interference signals corresponding to the first to n-th channel interference signals by using the output signals S1 to Sn of the first to n-th channel interference cancellation units 200_1 to 200_n and cancel the first to n-th channel interference signals from the digitally converted received signals by using the first to n-th estimated interference signals and output the interference cancelled signals.

In some embodiments, the first channel interference cancellation unit 200_1 is configured as processing units PU1 to PUn (see FIGS. 3 to 8) are connected in series, that generate the estimated interference signal corresponding to any one of the first to n-th channel interference signals and cancel channel interference signals corresponding to the generated estimated interference signals from the digitally converted received signal, thereby canceling the first to n-th channel interference signals from the digitally converted received signals and outputting the interference cancelled signals.

In another embodiment, the first channel interference cancellation unit 200_1 is constituted by one processing unit PU1 (see FIGS. 9 to 10), that generates the estimated interference signals corresponding to the first to n-th channel interference signals in parallel and sequentially cancel channel interference signals corresponding to the generated estimated interference signals from the digitally converted received signal, thereby canceling the first to n-th channel interference signals from the digitally converted received signals and outputting the interference cancelled signals.

In yet another embodiment, the first channel interference cancellation unit 200_1 is constituted by connecting serially the processing unit PU1 (see FIGS. 11 and 12) that generates the estimated interference signal corresponding to any one of the first to n-th channel interference signals and cancel the interference signal of the channel by using the generated estimated interference signal and the processing unit PU2 (see FIGS. 11 and 12) that generates other estimated interference signals in parallel and cancel the channel interference signals by using the generated estimated interference signals, thereby canceling the first to n-th channel interference signals from the digitally converted received signals and outputting the interference cancelled signals. Alternatively, the first channel interference cancellation unit 200_1 is constituted by the processing units PU1 and PU2 (see FIGS. 13 and 14) that generate the estimated interference signals in parallel, thereby canceling the first to n-th channel interference signals from the digitally converted received signals and outputting the interference cancelled signals.

The first channel digital/analog conversion unit 300_1 may be connected with the first channel interference cancellation unit 200_1. The first channel digital/analog conversion unit 300_1 may receive the output signal S1, that is, the signal acquired by canceling the interference signals of each channel like the original signal from the downlink signal from the first channel interference cancellation unit 200_1 and convert the received output signal S1 into an analog signal. The first channel digital/analog conversion unit 300_1 may be connected with the first transmitting antenna TX1 and transmit the analog converted output signal to the terminal MS (see FIG. 1) through the first transmitting antenna TX1.

Although not illustrated, the multi-antenna relay device 10 may further include a frequency up converter converting the analog converted output signal into the signal in the radio frequency band and a linear power amplifier amplifying and outputting the output signal frequency up-converted by the frequency up converter. However, the frequency up converter may be optionally omitted.

As described above, the multi-antenna relay device 10 includes the interference cancellation unit that may cancel the interference signals by all channels from the received signal for the respective channels in real time, thereby improving transmission rate and a quality of communication service, and minimizing signal interference and oscillation by adopting multiple antennas.

Figure 3:
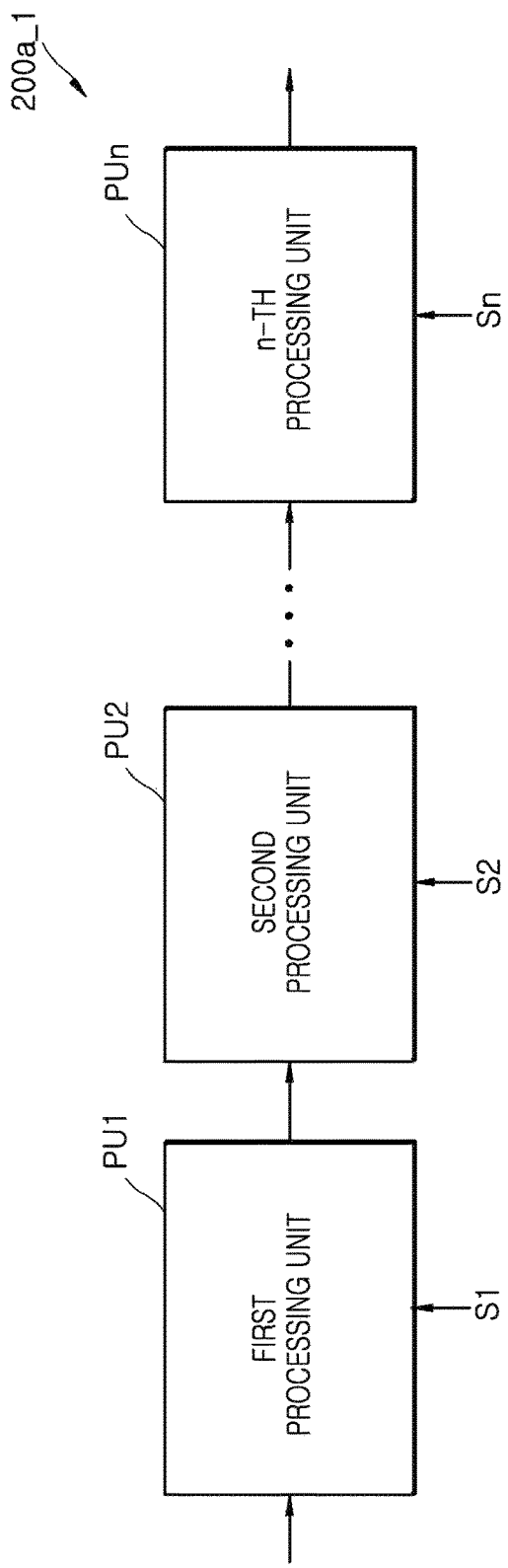
FIGS. 3 to 5 are diagrams for describing one implementation example of an interference cancellation unit in the multi-antenna relay device of FIG. 2.
Figure 4:
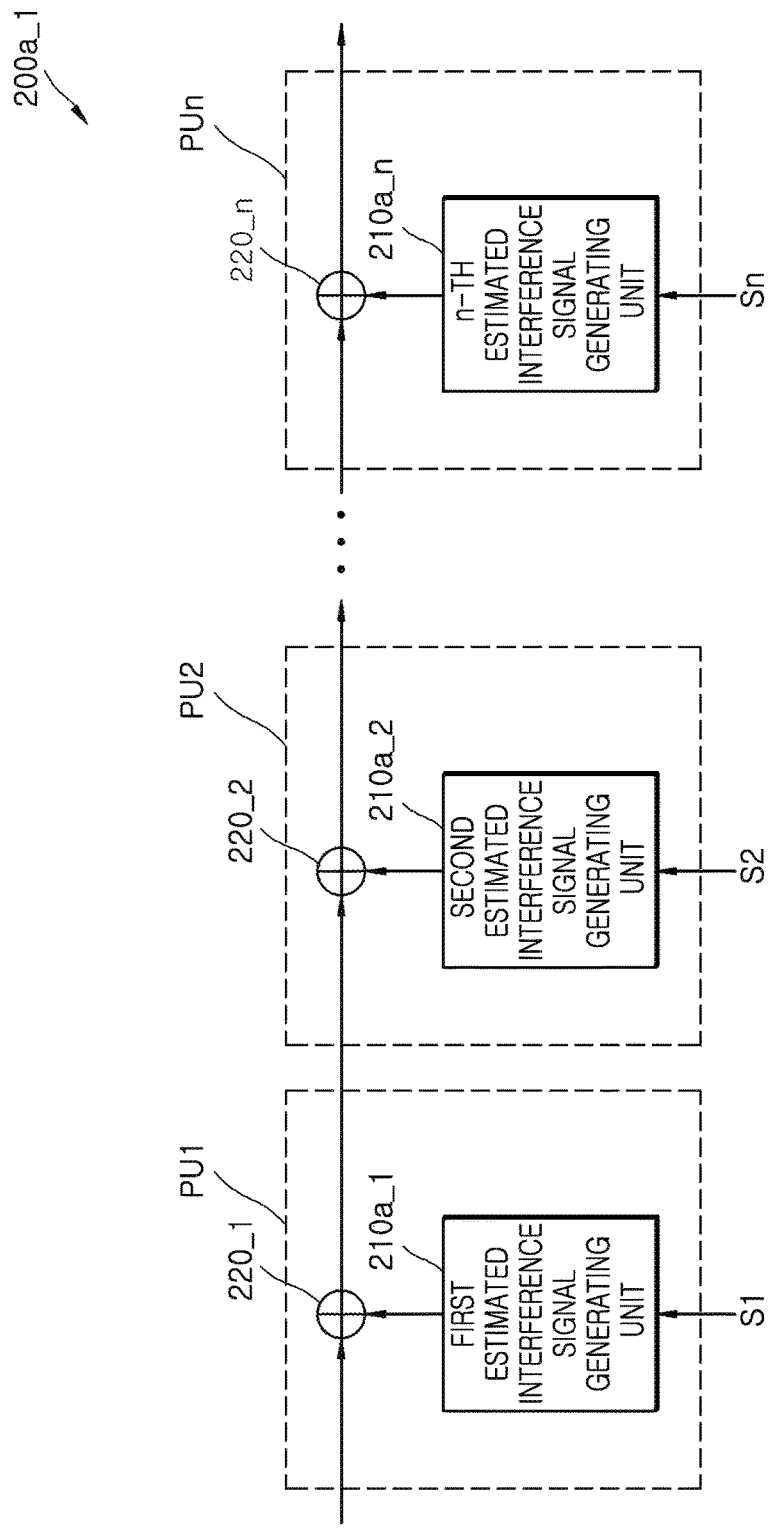
Figure 5:
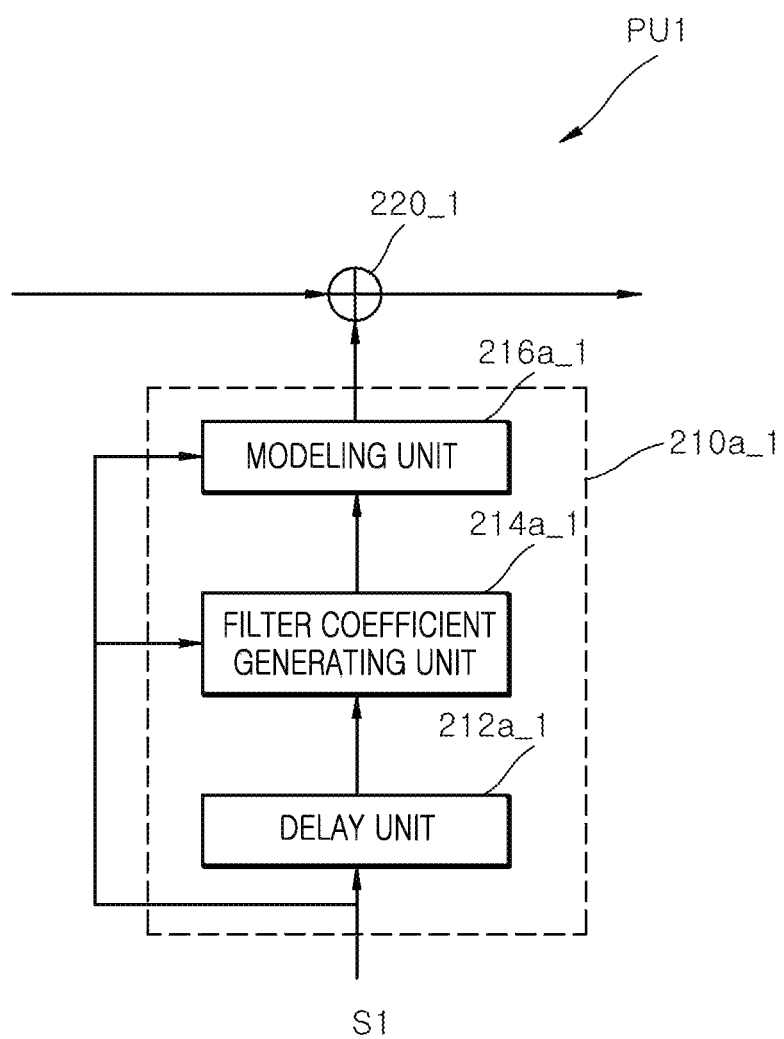

FIGS. 3 to 5 are diagrams for describing one implementation example of an interference cancellation unit in the multi-antenna relay device 10 of FIG. 2. In detail, FIGS. 3 to 5 illustrate one implementation example of the first channel interference cancellation unit 200_1 of FIG. 2, FIG. 3 is a block diagram schematically illustrating a first channel interference cancellation unit 200a_1, FIG. 4 is a diagram illustrating the first to n-th processing units PU1 to PUn more specifically, and FIG. 5 is a block diagram schematically illustrating a first channel estimation interference signal generating unit 210a_1. Although not illustrated in FIGS. 3 to 5, in the multi-antenna relay device 10, the second to n-th channel interference cancellation units 200_2 to 200_n may have the same configuration as the first channel interference cancellation unit 200a_1. However, the inventive concept is not limited thereto and the second to n-th channel interference cancellation units 200_2 to 200_n may be constituted by any one of implementation examples of FIGS. 6 to 14 to be described below.

Referring to FIGS. 2 and 3, the first channel interference cancellation unit 200a_1 may include the first to n-th processing units PU1 to PUn connected to each other in series.

Each of the first to n-th processing units PU1 to PUn may receive a corresponding output signal among the output signals S1 to Sn of the first to n-th channel interference cancellation units. For example, the first processing unit PU1 may receive the output signal S1 and the second processing unit PU2 may receive the output signal S2 of the second channel interference cancellation unit 200_2.

Each of the first to n-th processing units PU1 to PUn may generate a corresponding estimated interference signal among the first to n-th estimated interference signals by using the received output signal. For example, the first processing unit PU1 may generate the first estimated interference signal corresponding to the first channel interference signal and the second processing unit PU2 may generate the second estimated interference signal corresponding to the second channel interference signal.

Each of the first to n-th processing units PU1 to PUn may cancel the interference signal corresponding to the generated estimated interference signal from the signal input into the corresponding processing unit by using the generated estimated interference signal. For example, the first processing unit PU1 may cancel the first channel interference signal from the signal input into the first processing unit PU1, that is, the received signal of the first channel. The second processing unit PU2 may further cancel the second channel interference signal from the signal input into the second processing unit PU2, that is, the signal from which the first channel interference signal is cancelled by the first processing unit PU1 by using the second estimated interference signal.

Referring to FIGS. 2 to 4, each of the first to n-th processing units PU1 to PUn may be constituted by an estimated interference signal generating unit and a cancellation unit. Since the first to n-th processing units PU1 to PUn are substantially equally configured to each other, the first processing unit PU1 is described as an example for convenience of the explanation.

The first processing unit PU1 may be constituted by the first estimated interference signal generating unit 210a_1 and a first cancellation unit 220_1.

The first estimated interference signal generating unit 210a_1 may generate the first estimated interference signal based on the received signal of the first channel which is the input signal and the output signal S1. When the first estimated interference signal generating unit 210a_1 is described by referring back to FIG. 5, the first estimated interference signal generating unit 210a_1 may include a delay unit 212a_1, a filter coefficient generating unit 214a_1 and a modeling unit 216a_1. The delay unit 212a_1 which is used for compensating a delay in which the first channel interference signal is radiated from the first transmitting antenna TX1 and thereafter, fed back and input into the first receiving antenna RX1 may delay and output the output signal S1. The filter coefficient generating unit 214a_1 may receive the output signal S1 and the output signal S1 delayed by the delay unit 212a_1 and generate a filter coefficient by using an adaptive filter algorithm such as least mean square (LMS) or recursive least square (RLS) based on the output signal S1 and the delayed output signal S1. The modeling unit 216a_1 may receive the output signal S1 and the filter coefficient and generate the first estimated interference signal through a convolution operation using the output signal S1 and the filter coefficient. The modeling unit 216a_1 may be constituted by for example, a finite impulse response (FIR) filter. Meanwhile, when the first estimated interference signal is ideal, the first estimated interference signal may be substantially the same as the first channel interference signal.

Continuously referring to FIGS. 2 to 5, the first cancellation unit 220_1 may generate an inverse phase signal of the first estimated interference signal and cancel the first channel interference signal from the received signal of the first channel by aggregating the generated inverse phase first estimated interference signal and the received signal of the first channel. The first cancellation unit 220_1 may be constituted by for example, a subtractor.

As described above, the first channel interference cancellation unit 200a_1 may be configured to sequentially cancel the first to n-th channel interference signals from the received signal of the first channel through the first to n-th processing units PU1 to PUn. The first channel interference cancellation unit 200a_1 is advantageous in that the number of operation resources for canceling the first to n-th channel interference signals is small and implementation of the first channel interference cancellation unit 200a_1 is simple.

Figure 6:
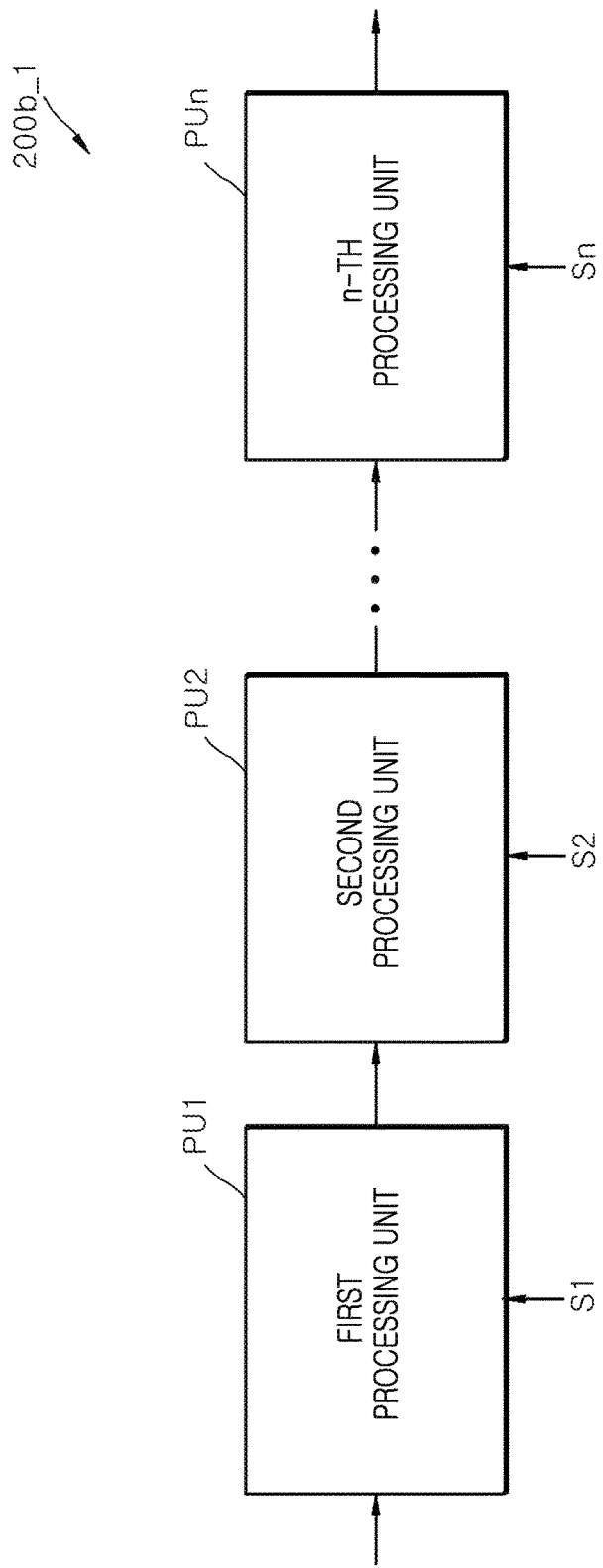
FIGS. 6 to 8 are diagrams for describing another implementation example of the interference cancellation unit in the multi-antenna relay device of FIG. 2.
Figure 7:
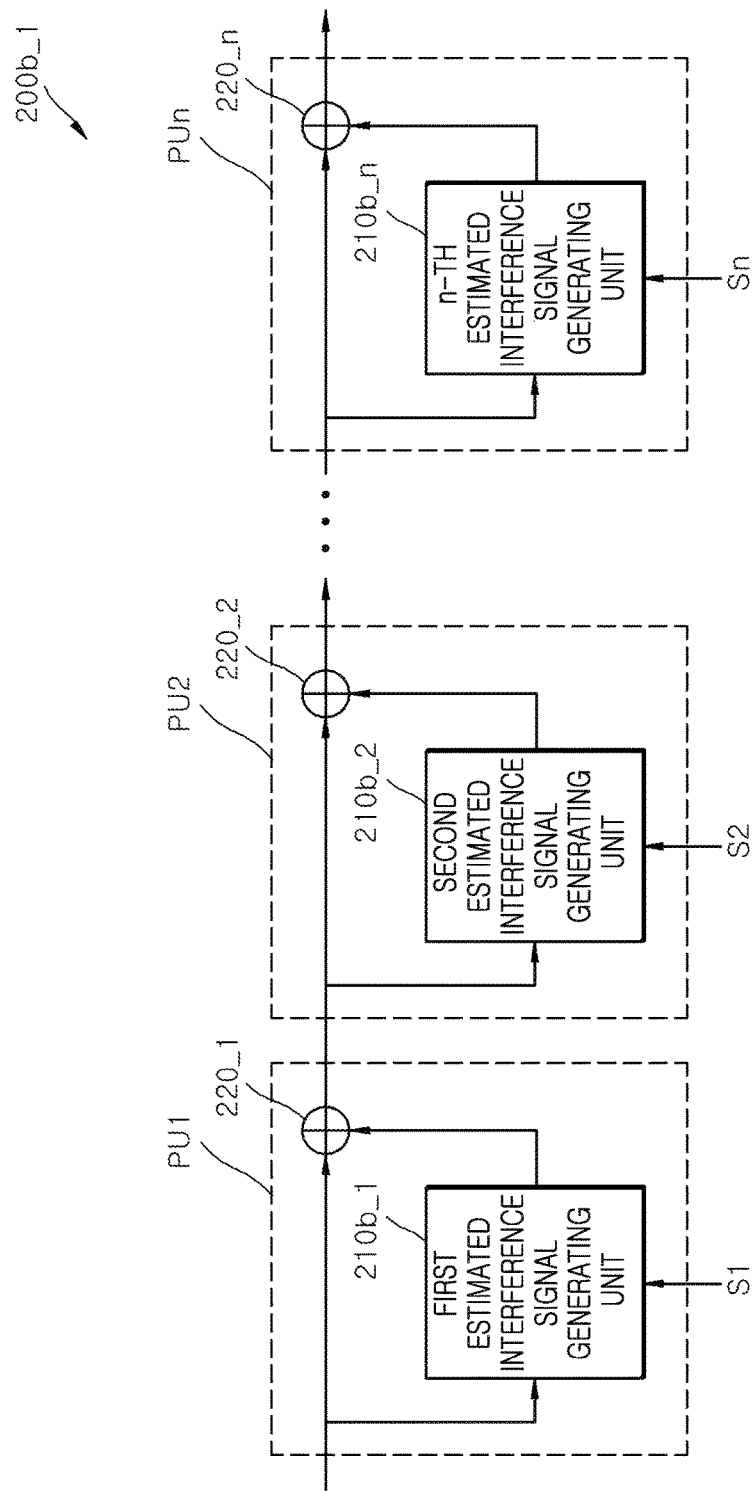
Figure 8:
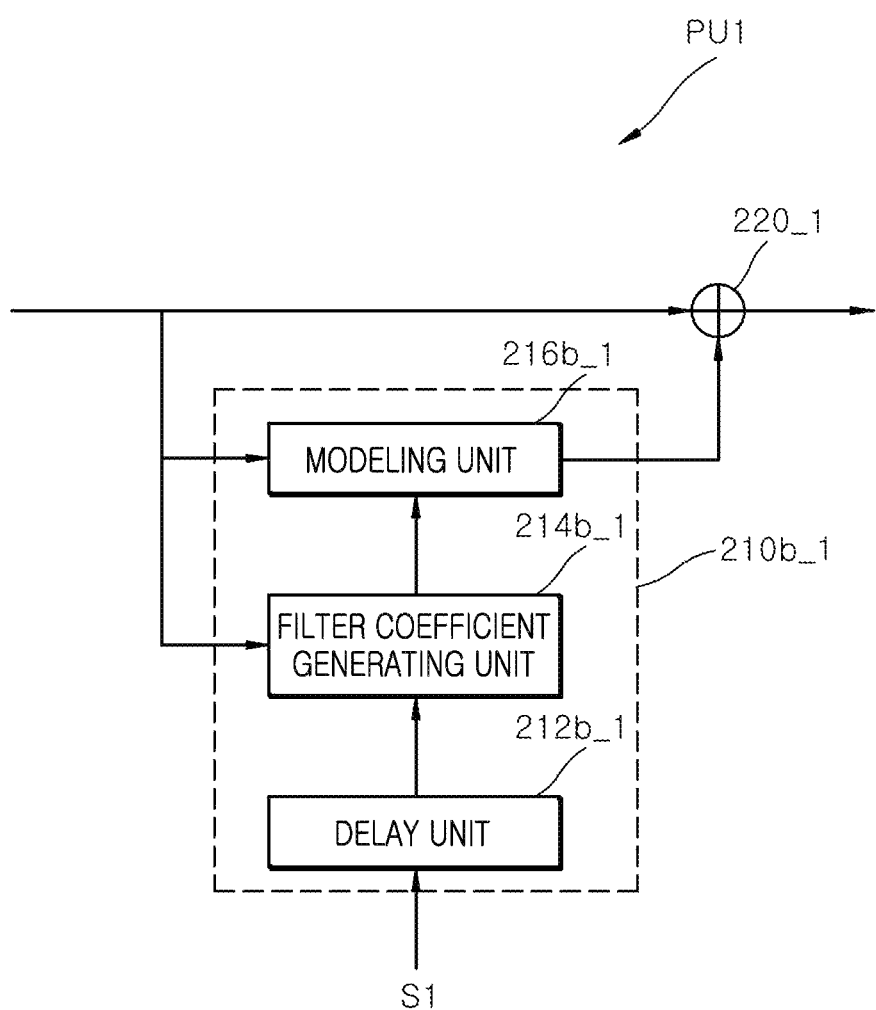

FIGS. 6 to 8 are diagrams for describing another implementation example of the interference cancellation unit in the multi-antenna relay device 10 of FIG. 2. In detail, FIGS. 6 to 8 illustrate one implementation example of the first channel interference cancellation unit 200_1 of FIG. 2, FIG. 6 is a block diagram schematically illustrating a first channel interference cancellation unit 200b_1, FIG. 7 is a diagram illustrating the first to n-th processing units PU1 to PUn more specifically, and FIG. 8 is a block diagram schematically illustrating a first channel estimation interference signal generating unit 210b_1. Although not illustrated in FIGS. 6 to 8, in the multi-antenna relay device 10, the second to n-th channel interference cancellation units 200_2 to 200_n may have the same configuration as the first channel interference cancellation unit 200b_1. However, the inventive concept is not limited thereto and the second to n-th channel interference cancellation units 200_2 to 200_n may be constituted by any one of implementation examples of FIGS. 3 to 5 described above and FIGS. 9 to 14. In describing FIGS. 6 and 8, duplicated description with FIGS. 3 to 5 will be omitted and a difference from FIGS. 3 to 5 will be primarily described.

Referring to FIGS. 2 and 6, the first channel interference cancellation unit 200b_1 may include the first to n-th processing units PU1 to PUn connected to each other in series.

Each of the first to n-th processing units PU1 to PUn may receive a corresponding output signal among the output signals S1 to Sn of the first to n-th channel interference cancellation units.

Each of the first to n-th processing units PU1 to PUn may generate the corresponding estimated interference signal by using a signal input into the corresponding processing unit together with the received output signal.

Each of the first to n-th processing units PU1 to PUn may cancel an interference signal corresponding to the generated estimated interference signal from the signal input into the corresponding processing unit by using the generated estimated interference signal.

Referring to FIGS. 2 and 7, each of the first to n-th processing units PU1 to PUn may be constituted by the estimated interference signal generating unit and the cancellation unit. Since the first to n-th processing units PU1 to PUn are substantially similarly configured to each other, the first processing unit PU1 is described as an example for easy description.

The first processing unit PU1 may be constituted by the first estimated interference signal generating unit 210b_1 and the first cancellation unit 220_1.

The first estimated interference signal generating unit 210b_1 may generate the first estimated interference signal based on the received signal of the first channel which is the input signal and the output signal S1. When the first estimated interference signal generating unit 210b_1 is described by referring back to FIG. 8, the first estimated interference signal generating unit 210b_1 may include a delay unit 212b_1, a filter coefficient generating unit 214b_1 and a modeling unit 216b_1. The delay unit 212b_1 which is used for compensating a delay in which the first channel interference signal is radiated from the first transmitting antenna TX1 and thereafter, fed back and input into the first receiving antenna RX1 may delay and output the received output signal S1. The filter coefficient generating unit 214b_1 may receive the received signal of the first channel and the delayed output signal S1 and generate the filter coefficient by using the adaptive filter algorithm such as the least mean square (LMS) or recursive least square (RLS) based on the received signal of the first channel and the delayed output signal S1. The modeling unit 216b_1 may receive the received signal of the first channel and the filter coefficient and generate the first estimated interference signal through the convolution operation using the received signal of the first channel and the filter coefficient. The modeling unit 216b_1 may be constituted by for example, the finite impulse response (FIR) filter. Meanwhile, when the first estimated interference signal is ideal, the first estimated interference signal may be substantially the same as the first channel interference signal.

Continuously referring to FIGS. 2 and 8, the first cancellation unit 220b_1 may generate the inverse phase signal of the first estimated interference signal and cancel the first channel interference signal from the received signal of the first channel by aggregating the generated inverse phase first estimated interference signal and the received signal of the first channel. The first cancellation unit 220_1 may be constituted by for example, the subtractor.

The first channel interference cancellation unit 200b_1 may be configured to sequentially cancel the first to n-th channel interference signals from the received signal of the first channel through the first to n-th processing units PU1 to PUn similarly to the first channel interference cancellation unit 200a_1 illustrated in FIGS. 3 to 5 and is advantageous in that the number of the operation resources for canceling the first to n-th channel interference signals and the implementation of the first channel interference cancellation unit 200b_1 is simple. However, the first channel interference cancellation unit 200b_1 is different from the first channel interference cancellation unit 200a_1 illustrated in FIGS. 3 to 5 in that the output signal and the signal input into the corresponding processing unit are used at the time of generating the corresponding estimated interference signal.

Figure 9:
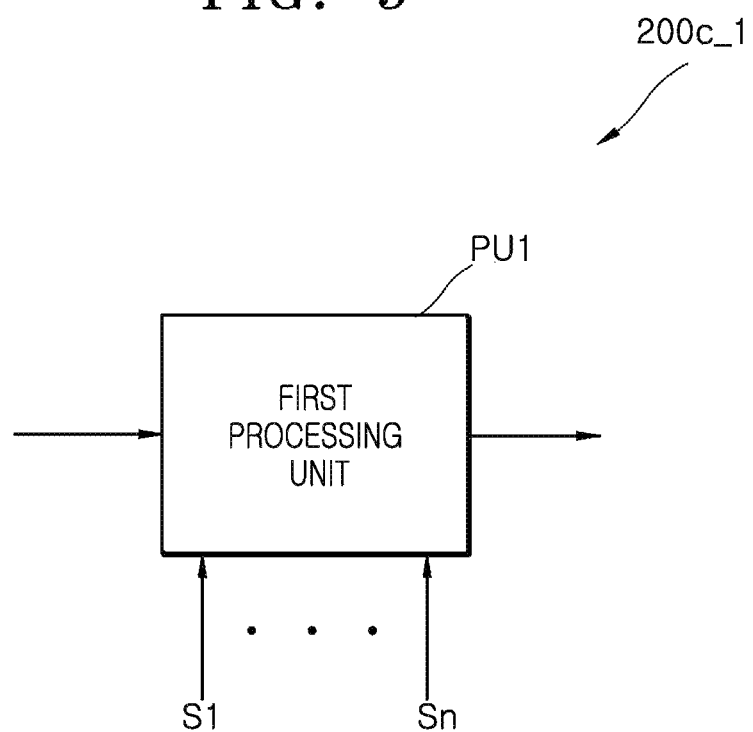
FIGS. 9 and 10 are diagrams for describing yet another implementation example of the interference cancellation unit in the multi-antenna relay device of FIG. 2.
Figure 10:
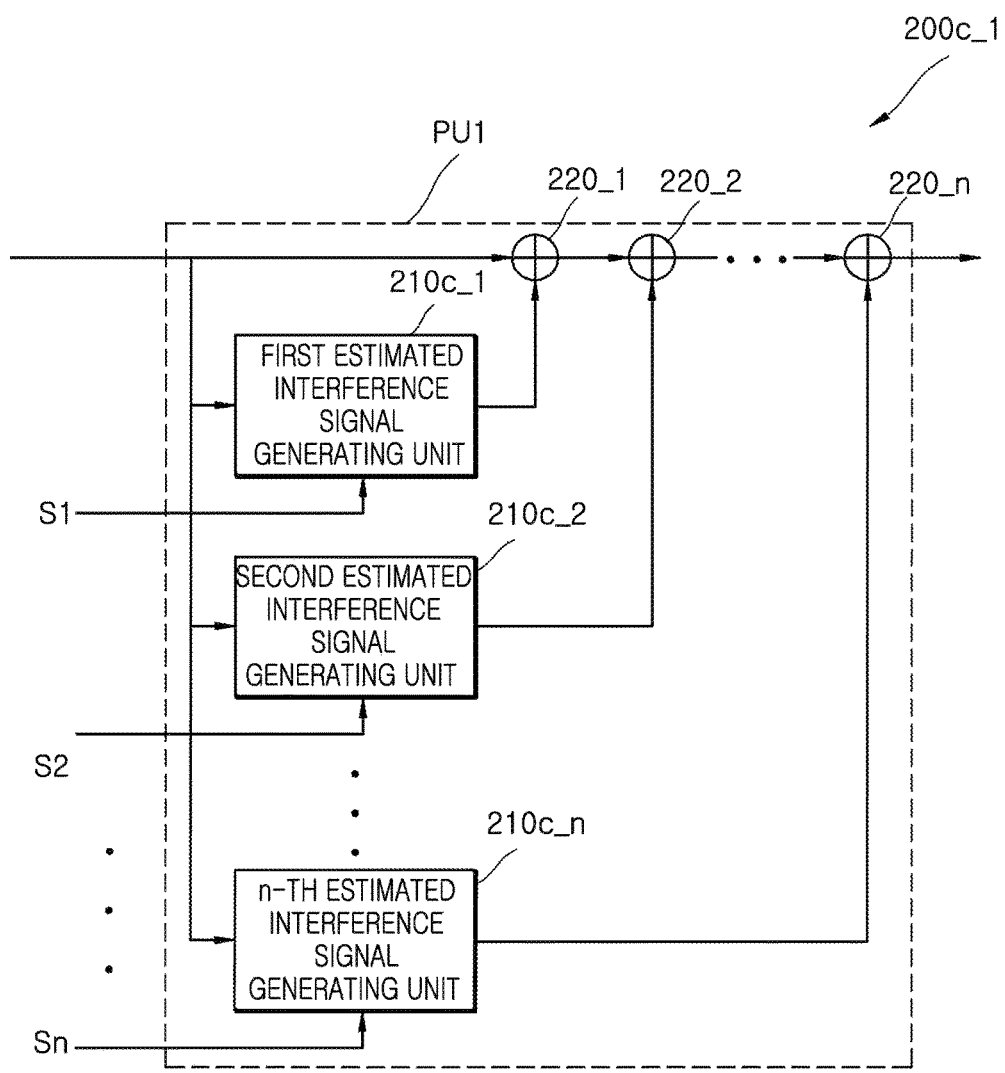

FIGS. 9 and 10 are diagrams for describing yet another implementation example of the interference cancellation unit in the multi-antenna relay device 10 of FIG. 2. FIGS. 9 and 10 illustrate one implementation example of the first channel interference cancellation unit 200_1 of FIG. 2, FIG. 9 is a block diagram schematically illustrating a first channel interference cancellation unit 200c_1, and FIG. 10 is a diagram, in more detail, illustrating the first processing unit PU1. Although not illustrated in FIGS. 9 and 10, in the multi-antenna relay device 10, the second to n-th channel interference cancellation units 200_2 to 200_n may have the same configuration as the first channel interference cancellation unit 200c_1, but the inventive concept is not limited thereto and the second to n-th channel interference cancellation units 200_2 to 200_n may be constituted by any one of the implementation examples of FIGS. 3 to 8 described above and implementation examples of FIGS. 11 to 14 to be described below.

Referring to FIGS. 2 and 9, the first channel interference cancellation unit 200c1 may include only one first processing unit PU1.

The first processing unit PU1 may receive the output signals S1 to Sn of the first to n-th channel interference cancellation units. The first processing unit PU1 may generate the first to n-th estimated interference signals corresponding to the first to n-th interference signals in parallel by using the received output signals S1 to Sn. The first processing unit PU1 may sequentially cancel the first to n-th channel interference signals from the signal input into the first channel, that is, the received signal of the first channel by using the first to n-th estimated interference signals.

When the first processing unit PU1 is described by referring back to FIG. 10, the first processing unit PU1 may include first to n-th estimated interference signal generating units 210c_1 to 210c_n connected to each other in parallel and the first to n-th cancellation units 220_1 to 220_n connected to each other in series.

Each of the first to n-th estimated interference signal generating units 210c_1 to 210c_n may receive the received signal of the first channel and a corresponding output signal among the output signals S1 to Sn and generate the first to n-th estimated interference signal in parallel based on the received signal of the first channel and the received output signal. For example, the first estimated interference signal generating unit 210c_1 may generate the first estimated interference signal based on the received signal of the first channel and the output signal S1 and the second estimated interference signal generating unit 210c_2 may generate the second estimated interference signal based on the received signal of the first channel and the output signal S2 in parallel thereto.

The first to n-th cancellation units 220_1 to 220_n may sequentially cancel the first to n-th channel interference signals from the received signal of the first channel by receiving a corresponding estimated interference signals from the first to n-th estimated interference signal generating units 210_1 to 210_n, respectively. For example, the first cancellation unit 220_1 receives the first estimated interference signal from the first estimated interference signal generating unit 210_1 to generate the inverse phase signal of the first estimated interference signal and aggregates the generated inverse phase first estimated interference signal and the received signal of the first channel to cancel the first channel interference signal from the received signal of the first channel. For example, the second cancellation unit 220_2 receives the second estimated interference signal from the second estimated interference signal generating unit 210_2 to generate the inverse phase signal of the second estimated interference signal and aggregates the generated inverse phase second estimated interference signal and the received signal of the first channel from which the first channel interference signal is removed to remove the second channel interference signal.

As described above, the first channel interference cancellation unit 200c_1 is advantageous in that the first to n-th estimated interference signal generating units 210c_1 to 210c_n are connected to each other in parallel, and as a result, the first to n-th estimated interference signals may be generated in parallel to reduce a delay of a processing time for canceling the first to n-th channel interference signals.

Figure 11:
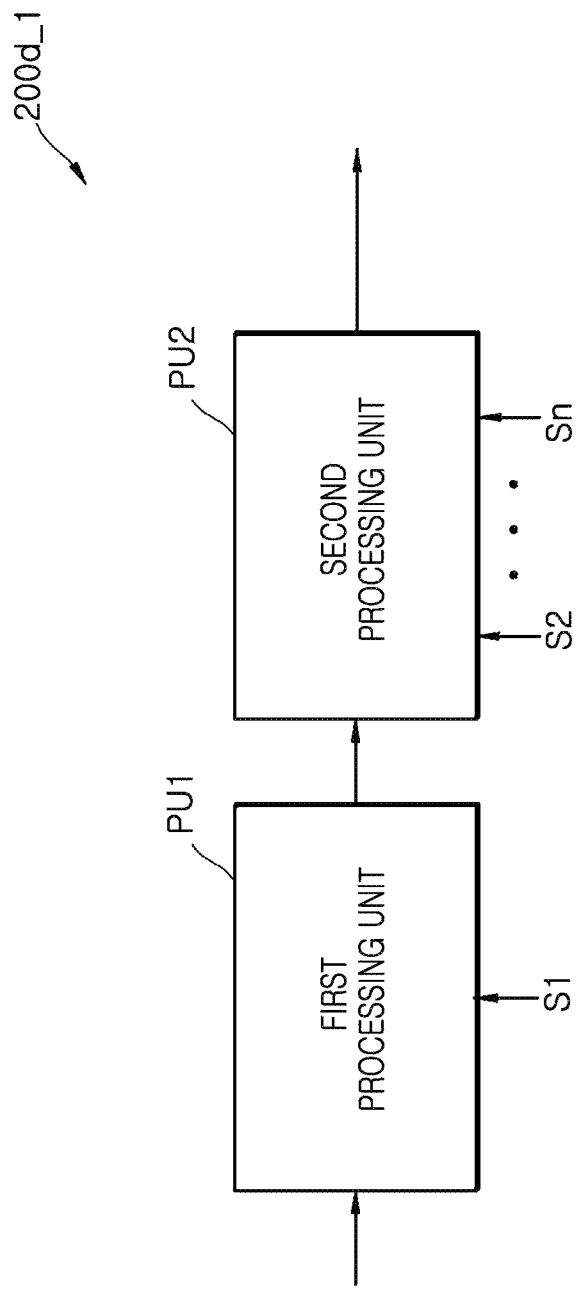
FIGS. 11 and 12 are diagrams for describing still yet another implementation example of the interference cancellation unit in the multi-antenna relay device of FIG. 2.
Figure 12:
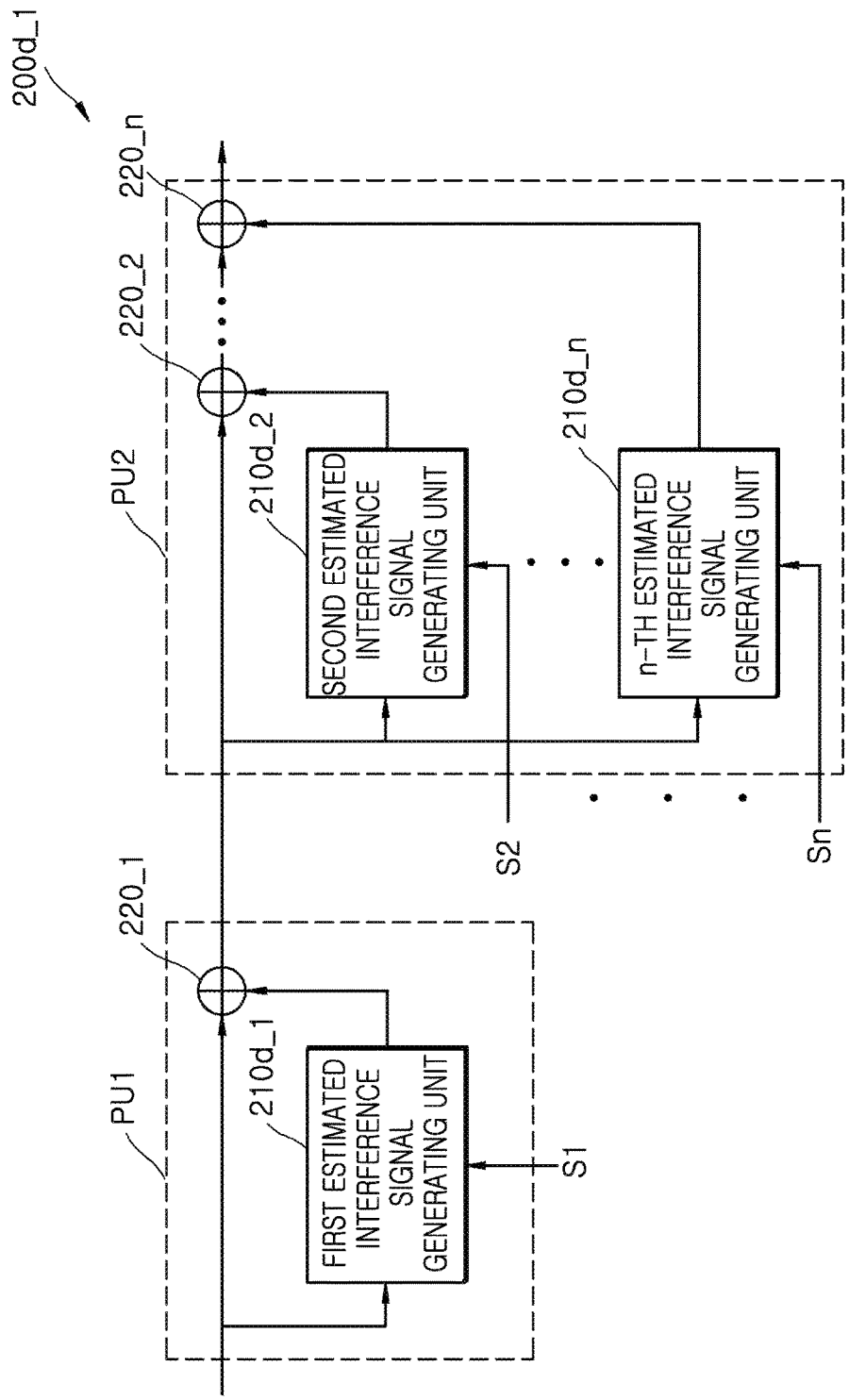

FIGS. 11 and 12 are diagrams for describing still yet another implementation example of the interference cancellation unit in the multi-antenna relay device 10 of FIG. 2. FIGS. 11 and 12 illustrate one implementation example of the first channel interference cancellation unit 200_1 of FIG. 2, FIG. 11 is a block diagram schematically illustrating a first channel interference cancellation unit 200d_1, and FIG. 12 is a diagram, in more detail, illustrating the first and second processing units PU1 and PU2. Although not illustrated in FIGS. 11 and 12, in the multi-antenna relay device 10, the second to n-th channel interference cancellation units 200_2 to 200_n may have the same configuration as the first channel interference cancellation unit 200d_1, but the inventive concept is not limited thereto and the second to n-th channel interference cancellation units 200_2 to 200_n may be constituted by any one of the implementation examples of FIGS. 3 to 10 described above and implementation examples of FIGS. 13 and 14 to be described below. In describing FIGS. 11 and 12, duplicated description with FIGS. 3 to 10 will be omitted and a difference from FIGS. 3 to 10 will be primarily described.

Referring to FIGS. 2, 11, and 12, the first channel interference cancellation unit 200d_1 may include the first and second processing units PU1 and PU2.

The first processing unit PU1 may receive the output signal S1 of the first channel interference cancellation unit 200d_1 and generate the first estimated interference signal corresponding to the first channel interference signal by using the received output signal S1 and the signal input into the corresponding processing unit, that is, the received signal of the first channel. The first processing unit PU1 may cancel the first channel interference signal from the received signal of the first channel by using the first estimated interference signal.

The first processing unit PU1 may be constituted by the first estimated interference signal generating unit 210d_1 and the first cancellation unit 220_1, and the first estimated interference signal generating unit 210d_1 and the first cancellation unit 220_1 may have substantially the same configuration as the estimated interference signal generating unit and the cancellation unit described with reference to FIGS. 6 to 8.

The second processing unit PU2 may receive the output signals S2 to Sn of the second to n-th channel interference cancellation units and generate the second to n-th estimated interference signals corresponding to the second to n-th channel interference signals in parallel by using the received output signals S2 to Sn. The second processing unit PU2 may sequentially cancel the second to n-th channel interference signals from the signal input into the corresponding processing unit, that is, the received signal of the first channel from which the first channel interference signal is canceled by using the second to n-th estimated interference signals.

The second processing unit PU2 may have substantially the same configuration as the processing unit described with reference to FIGS. 9 and 10. That is, the second processing unit PU2 may be constituted by second to n-th estimated interference signal generating units 210d_2 to 210d_n connected to each other in parallel and the second to n-th cancellation units 220_2 to 220_n connected to each other in series.

Meanwhile, unlike FIGS. 9 and 10, the first channel interference cancellation unit 200d_1 may further include a processing unit similar to the first processing unit PU1. In this case, the second processing unit PU2 may be configured to cancel a smaller number of channel interference signals.

Figure 13:
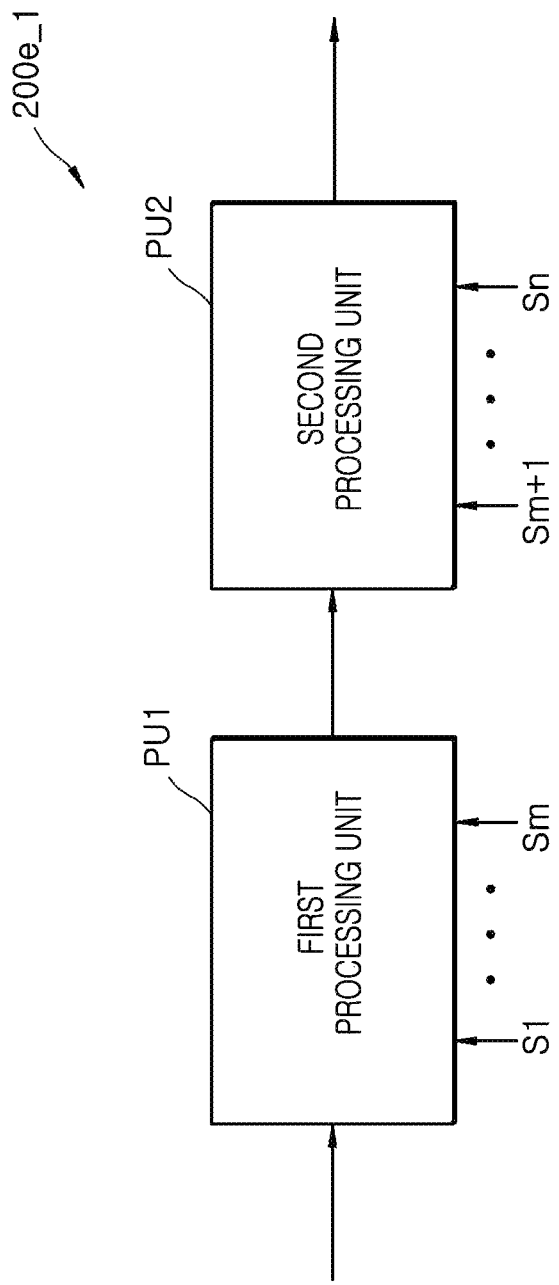
FIGS. 13 and 14 are diagrams for describing still yet another implementation example of the interference cancellation unit in the multi-antenna relay device of FIG. 2.
Figure 14:
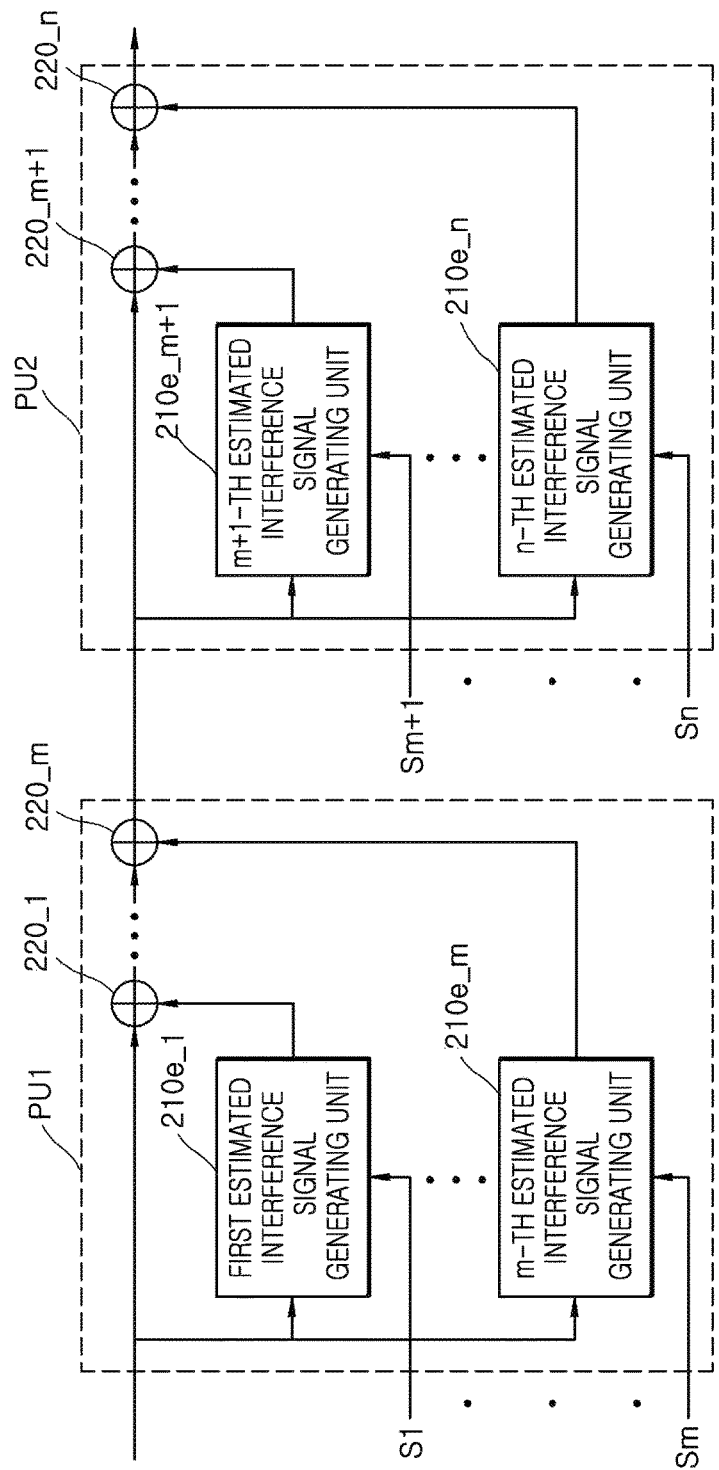

Further, the second processing unit PU2 may be separated into processing units having a similar configuration thereto as illustrated in FIGS. 13 and 14 to be described below. In addition, a connection order of the first processing unit PU1 and the second processing unit PU2 may be changed in the first channel interference cancellation unit 200d_1, of course.

As described above, the first channel interference cancellation unit 200d_1 is configured in such a manner that some of the first to n-th channel interference signals are canceled by individual components which respectively generate corresponding estimated interference signals, respectively and other some of the first to n-th channel interference signals are canceled by components generate corresponding estimated interference signals in parallel to appropriately implement the reduction of the number of operation resources, the easiness of the implementation, and the reduction of the interference canceling time delay.

FIGS. 13 and 14 are diagrams for describing one implementation example of an interference cancellation unit in the multi-antenna relay device 10 of FIG. 2. FIGS. 13 and 14 illustrate one implementation example of the first channel interference cancellation unit 200_1 of FIG. 2, FIG. 13 is a block diagram schematically illustrating a first channel interference cancellation unit 200e_1, and FIG. 14 is a diagram, in more detail, illustrating the first and second processing units PU1 and PU2. Although not illustrated in FIGS. 13 and 14, in the multi-antenna relay device 10, the second to n-th channel interference cancellation units 200_2 to 200_n may have the same configuration as the first channel interference cancellation unit 200e_1, but the inventive concept is not limited thereto and the second to n-th channel interference cancellation units 200_2 to 200_n may be constituted by any one of the implementation examples of FIGS. 3 to 12 described above. In describing FIGS. 13 and 14, duplicated description with FIGS. 3 to 12 will be omitted and a difference from FIGS. 3 to 12 will be primarily described.

Referring to FIGS. 2, 13, and 14, the first channel interference cancellation unit 200e_1 may include the first and second processing units PU1 and PU2.

The first processing unit PU1 may receive output signals S1 to Sm of first to m-th (m is a natural number which is equal to or larger than 2 and smaller than n−1) interference cancellation units and generate first to m-th estimated interference signals corresponding to first to m-th estimated interference signals in parallel by using the received output signals S1 to Sm. The second processing unit PU2 may sequentially cancel the first to m-th channel interference signals from the signal input into the first channel, that is, the received signal of the first channel by using the first to m-th estimated interference signals.

The first processing unit PU1 may have substantially the same configuration as the processing unit described with reference to FIGS. 9 and 10. That is, the first processing unit PU1 may be constituted by second to m-th estimated interference signal generating units 210e_1 to 210e_m connected to each other in parallel and the second to n-th cancellation units 220_2 to 220_m connected to each other in series.

The second processing unit PU2 may receive output signals Sm+1 to Sn of m+1-th to n-th channel interference cancellation units and generate m+l-th to n-th estimated interference signals corresponding to m+1 to n-th channel interference signals in parallel by using the received output signals Sm+1 to Sn. The second processing unit PU2 may sequentially cancel the m+1 to n-th channel interference signals from the signal output from the first processing unit PU1, that is, the received signal of the first channel from which the first to m-th channel interference signals are removed by using the m+1 to n-th estimated interference signals.

The second processing unit PU2 may also have substantially the same configuration as the processing unit described with reference to FIGS. 9 and 10. That is, the second processing unit PU2 may be constituted by m+1 to n-th estimated interference signal generating units 210e_m+1 to 210e_n connected to each other in parallel and the m+1 to n-th cancellation units 220_m+1 to 220_n connected to each other in series.

Meanwhile, in FIGS. 13 and 14, the first channel interference cancellation unit 200e_1 may further include a processing unit similar to the first and second processing units PU1 and PU2, of course.

As described above, the first channel interference cancellation unit 200e_1 may not connect all of the first to n-th estimated interference signal generating units 210_1 to 210_n in parallel but divide all of the first to n-th estimated interference signal generating units 210_1 to 210_n by the unit of a predetermined group and connect the divided estimated interference signal generating units in parallel to reduce the number of operation resource and improve the easiness of the implementation.

The inventive concept has been described with reference to the embodiments of the inventive concept. However, it will be appreciated by those skilled in the art that various modifications and changes of the inventive concept can be made without departing from the spirit and the scope of the inventive concept which are defined in the appended claims and their equivalents.

The invention claimed is:

1. A relay device having first to n-th (n is a natural number of 2 or more) channels formed between receiving antennas and transmitting antennas respectively corresponding to the receiving antennas, the relay device comprising:
    first to n-th channel interference cancellers disposed in the first to n-th channels respectively and configured to cancel first to n-th channel interference signals respectively in real time, which are generated due to signals radiated by the transmitting antennas,
    wherein at least one of the first to n-th channel interference cancellers comprises first to n-th processors connected in series and respectively corresponding to the first to n-th channels,
    wherein each processor of the first to n-th processors is configured to:

receive a corresponding output signal among output signals of the first to n-th channel interference cancellers, generate an estimated interference signal of a specific channel corresponding to the each processor based on the corresponding output signal, and cancel the estimated interference signal from an input signal of the each processor, and wherein the first to n-th channel interference cancellers respectively output first to n-th channel interference canceled signals which are received from n-th processors of the first to n-th channel interference cancellers.

2. The relay device of claim 1, wherein the each processor comprises:

an estimated interference signal generator configured to generate the estimated interference signal of the specific channel based on the received output signal; and a canceller configured to cancel the estimated interference signal from the input signal of the each processor.

3. The relay device of claim 2, wherein the estimated interference signal generator is further configured to:

generate a delayed output signal by delaying the received output signal, generate a filter coefficient corresponding to the specific channel based on the delayed output signal and the received output signal, and generate the estimated interference signal of the specific channel based on the filter coefficient and the received output signal.

4. The relay device of claim 1, wherein the each processor comprises:

an estimated interference signal generator configured to generate the estimated interference signal of the specific channel based on a corresponding output signal among the received output signal and the input signal of the each processor; and a canceller configured to cancel the estimated interference signal from the input signal of the each processor.

5. The relay device of claim 4, wherein the estimated interference signal generator is further configured to:

generate a delayed output signal by delaying the received output signal, generate a filter coefficient corresponding to the specific channel based on the delayed output signal and the input signal of the each processor, and generate the estimated interference signal of the specific channel based on the filter coefficient and the input signal of the each processor.

6. A relay device having first to n-th (n is a natural number of 2 or more) channels formed between receiving antennas and transmitting antennas respectively corresponding to the receiving antennas, the relay device comprising:

first to n-th channel interference cancellers disposed in the first to n-th channels respectively and configured to cancel first to n-th channel interference signals respectively in real time, which are generated due to signals radiated by the transmitting antennas, wherein at least one channel interference canceller of the first to n-th channel interference cancellers includes a processor, wherein the processor is configured to:

receive output signals of the first to n-th channel interference cancellers, generate first to n-th estimated interference signals which respectively correspond to the first to the n-th channels, in parallel, based on the received output signals and an input signal of the at least one channel interference canceller, and sequentially cancel the first to n-th estimated interference signals from the input signal of the at least one channel interference canceller, and wherein the at least one channel interference canceller outputs a channel interference canceled signal received from the processor.

7. The relay device of claim 6, wherein the processor includes, first to n-th estimated interference signal generators configured to generate the first to n-th estimated interference signals which respectively correspond to the first to n-th channels, respectively, based on a corresponding output signal among the received output signals and an input signal of the at least one channel interference canceller; and first to n-th cancellers connected in serial and configured to sequentially cancel the first to n-th estimated interference signals from the input signal of the at least one channel interference canceller.

8. The relay device of claim 7, wherein each of the first to n-th estimated interference signal generator is configured to:

generate a delayed output signal by delaying the corresponding output signal among the received output signals, generate a filter coefficient based on the delayed output signal and the corresponding output signal, and generate a corresponding estimated interference signal among the estimated interference signals based on the filter coefficient and the corresponding output signal.

9. A relay device having first to n-th (n is a natural number of 2 or more) channels formed between receiving antennas and transmitting antennas respectively corresponding to the receiving antennas, the relay device comprising:

first to n-th channel interference cancellers disposed in the first to n-th channels respectively and configured to cancel first to n-th channel interference signals respectively in real time, which are generated due to signals radiated by the transmitting antennas, wherein at least one channel interference canceller of the first to n-th channel interference cancellers comprises:

at least one first processor configured to:

receive a corresponding output signal among output signals of the first to n-th channel interference signal cancellers, generate an estimated interference signal of a specific channel corresponding to the at least one channel interference canceller based on the corresponding output signal and an input signal of the at least one first processor, and cancel the estimated interference signal from the input signal of the at least one first processor; and a second processor connected with the at least one first processor in series and configured to:

receive a plurality of output signals, which do not include the output signal, among the output signals of the first to n-th channel interference signal cancellers, generate a plurality of estimated interference signals which respectively correspond to the first to n-th channels except for the specific channel, based on the plurality of output signals and an input signal of the second processor, and sequentially cancel the plurality of estimated interference signals from input signal of the second processor,
wherein the at least one channel interference canceller outputs a channel interference canceled signal which is received from the second processor.

* * * * *